United States Patent Office 3,208,960
Patented Sept. 28, 1965

3,208,960
NOVEL POLYURETHANE COMPOSITIONS AND METHODS OF PREPARING SAME
Raymond R. Hindersinn, Lewiston, N.Y., and Michael Worsley, Clyde, Alberta, Canada, assignors to Hooker Chemical Corporation, Niagara Falls, N.Y., a corporation of New York
No Drawing. Filed Dec. 10, 1964, Ser. No. 417,490
17 Claims. (Cl. 260—2.5)

This is a continuation-in-part of copending application Serial Number 76,122, filed December 16, 1960.

This invention relates to polyurethane compoistions and to processes for producing them. The invention further relates to novel polyurethane foamable compositions and foam products, and to processes for producing them.

The compositions of the present invention are useful in the preparation of highly fire-resistant foamed or cellular plastic products. The compositions of the invention are further useful in the preparation of adhesives, binders, laminates, coatings and potting compounds.

The polyurethane foams have found wide and varied use in industry. For instance, they can be used as core materials between skins of many and varied compositions. In aircraft construction, the foam can be enclosed between aluminum or fiber glass reinforced plastic skins to form an assembly which is rigid, strong and yet remarkably light. Because of their excellent electrical properties, polyurethane foams enclosed by fiber glass reinforced plastic skins have also found use in the construction of radomes. The polyurethane foams have another useful property; they develop a high degree of adhesion during the foaming process. As a result, they will adhere to skins composed of such varied materials as metals, plastics, ceramics, and glass. The resulting sandwich-type assemblies lend themselves well for use in such diverse fields as in the construction and insulation industries.

The rigid plastic foams can also be utilized without skins as insulating materials to surround hot water or steam pipes and valves. Their utility for such applications is enhanced by their ability to be applied, foamed, and used in situ.

The rigid plastic foams have many desirable properties. They have great structural strength coupled with low density. In sandwich-type constructions, they exhibit a high degree of rigidity, a property particularly desirable for building purposes. They are excellent vibration dampers and can thus support highly resonant loads. Because of their fine cell structure, they are excellent heat and sound insulators. The foam cells can be made very fine and uniform, so that the cells are tough and non-brittle and hence, highly resistant to rupturing.

Many of the polyurethane compositions and foams of the prior art have the disadvantage of being flammable. This disadvantage prevents the use of these materials in many applications. This problem is overcome by the compositions disclosed and claimed in United States Patent 2,865,869. Fire resistance is imparted to these polyurethane compositions by incorporating therein polycarboxylic adducts of hexahalocyclopentadiene. The mechanical handling of the compositions disclosed in this patent has not been entirely satisfactory because the incorporation of halogen-containing compounds into the polyester portion of the composition causes an increase in viscosity, and when the halogen content is greater than fifteen percent, solid alkyds result. Such solid polyester alkyds are difficult to handle for the production of polyurethane foams, adhesives, coatings and the like.

It has been previously found that plasticizers such as tricresyl phosphate or a mixture of methyl pentachlorostearate and epoxidized soybean oil can be advantageously added to such solid alkyds to lower their viscosity and permit easier handling. However, such materials plasticize the finished foam and adversely affect the physical properties of the foams containing them. The principal disadvantage in using such plasticizers is the reduction in the strength of the foam at elevated temperatures.

It is an object of the present invention to provide polyurethane compositions for use in the production of fire-resistant foams. It is another object of this invention to provide polyurethane compositions for use in the production of foams having high strength and water resistance. Another object is to provide polyurethane foams that are strong, fire-resistant, and resistant to the deleterious effects of water at elevated temperatures. Still another object is to provide polyurethane compositions that are useful in preparing adhesives, fibers, laminates, coatings, and potting compounds. Another object is to provide a process for readily preparing such compositions and foams.

In accordance with this invention, it is found that the handling characteristics of polyurethane compositions can be improved without adversely affecting the ultimate physical properties, by employing low viscosity liquids containing groups capable of reacting with an isocyanate during the preparation of the composition. In this manner the liquid additives are incorporated into the finished foam by chemical reaction.

Such low viscosity liquids include hydroxyl-containing compounds having at least three hydroxyl groups per molecule, more particularly the low molecular weight polyesters such as the reaction product of trimethyloyl propane and adipic acid. Other suitable polyesters can be prepared using polycarboxylic compounds such as succinic acid, sebacic acid, fumaric acid, fumaryl chloride, maleic anhydride, phthalic anhydride, glutaric acid, malonic acid, azelaic acid, ricinoleic acid, diglycolic acid, dimer acid, trimellitic acid, and the like; and polyhydric alcohols such as trimethylol ethane, glycerol, 1,2,6-hexanetriol, diethylene glycol, propylene glycol, pentaerythritol, sorbitol and mannitol. Mixtures of such acids and alcohols can be employed, but at least one component must have at least three functional groups to provide a polyester having at least three hydroxyl groups. Such polyesters are generally prepared so that their hydroxyl number is in the range of 200 to 950. The molecular weight of the polyester additive is generally in the range of about 200 to 3000, preferably in the range of about 300 to 2000. When appreciable amounts of the components employed are tetrafunctional, or of higher functionality, mild reaction temperatures of up to 140 degrees centigrade and active carboxylic compounds, such as diacid chlorides, are employed to avoid gelation of the reactants. Otherwise the conditions commonly known in the art are employed, i.e., reaction temperatures up to 250 degrees centigrade, preferably 150–225 degrees centigrade, and the like. Thus, it is seen that a wide variety of materials can be used. It is preferred that the viscosity of the liquid additive be less than one hundred Gardner seconds at fifty degrees centigrade.

The additives contemplated in the invention can be used in amounts up to fifty weight percent of halogenated alkyd resin of the polyurethane composition, preferably in the range of ten to fifty percent, but even higher proportions can be employed, if desired.

It is found that when the additives containing three hydroxyl groups per molecule are employed in the present invention, the polyurethane compositions retain substantially all of their strength at elevated temperatures, thus providing an additional advantage for using this class of compounds. The polyesters employed are generally those wherein the non-hydroxyl groups are predominantly ester linkages, i.e., wherein at least fifty percent of the non-hydroxylic groups consist of the ester linkage,

In accordance with the present invention, it is found that polyurethane compositions can be produced by utilizing a mixture comprising (A) an alkyd resin selected from the group consisting of (1) the reaction product of (a) an adduct of hexahalocyclopentadiene and a polycarboxylic compound containing aliphatic carbon-to-carbon unsaturation, and (b) a polyhydric alcohol containing at least three hydroxyl groups, (2) the reaction product of (a) an adduct of hexahalocyclopentadiene and a polyhydric alcohol containing aliphatic carbon-to-carbon unsaturation, (b) a polyhydric alcohol containing at least three hydroxyl groups and (c) a polycarboxylic compound, (3) the reaction product of (a) an adduct of hexahalocyclopentadiene and a polyhydric alcohol containing aliphatic carbon-to-carbon unsaturation, and (b) a polycarboxylic compound containing at least three carboxyl groups, and (4) mixtures thereof, wherein the halogen is selected from the group consisting of chlorine, fluorine, bromine and mixtures thereof; (B) a polyester having at least three hydroxyl groups per molecule; and (C) an organic polyisocyanate. Foamable compositions are prepared by adding to this mixture a fourth component, (D) a foaming agent.

Among the adducts of hexahalocyclopentadiene and polycarboxylic compounds which can be used in the preparation of the alkyd of this invention are:

1,4,5,6,7,7-hexachlorobicyclo-(2.2.1)-5-heptene-2,3-dicarboxylic acid;
1,4,5,6,7,7-hexabromobicyclo-(2.2.1)-5-heptene-2,3-dicarboxylic acid;
1,4,5,6,7,7-hexachlorobicyclo-(2.2.1)-5-heptene-2,3-dicarboxylic anhydride;
1,4,5,6,7,7-hexachloro-2-methylbicyclo-(2.2.1)-5-heptene-2,3-dicarboxylic anhydride;
the mono- or di-methyl ester of 1,4,5,6,7,7,-hexachlorobicyclo-(2.2.1)-5-heptene-2,3,-dicarboxylic acid;
1,4,5,6-tetrachloro-7,7-difluorobicyclo-(2.2.1)-5-heptene-2,3-dicarboxylic acid;
1,4,5,6,7,7-hexachlorobicyclo-(2.2.1)-5-heptene-2-acetic-2-carboxylic anhydride; and
1,4,5,6,7,7-hexachlorobicyclo-(2.2.1)-5-heptene-2,3-dicarbonyl chloride which is the adduct of hexachlorocyclopentadiene with fumaryl chloride.

Among the adducts of hexahalocyclopentadiene and polyhydric alcohols which can be used in the preparation of the alkyd of this invention are:

2,3-dimethylol-1,4,5,6,7,7-hexachlorobicyclo-(2.2.1)-5-heptene; and
3-(1,4,5,6,7,7-hexachlorobicyclo-(2.2.1)-5-heptene-2-yl)-methoxy-1,2-propanediol;
2,3-dimethylol-1,4,5,6-tetrachloro-7,7-difluorobicyclo-(2.2.1)-5-heptene;
2,3-dimethylol-1,4,5,6,7,7-hexabromobicyclo-(2.2.1)-5-heptene;
3-(1,4,5,6-tetrachloro-7,7-difluorobicyclo-(2.2.1)-5-heptene-2-yl)-methoxyl-1,2-propane diol.

These compounds and the method of preparation are disclosed in U. S. Patent 3,007,958.

It is generally desirable that at least a portion of the total polyhydric alcohol component (b) contain three hydroxyl groups in order to provide a means for branching the alkyd. The entire alcohol component can comprise a trifunctional alcohol, such as glycerol; or a difunctional polyhydric alcohol can be utilized as a part of the polyhydric alcohol component. Illustrative of polyhydric alcohols which can be used are the following: ethylene glycol; 1,4-butanediol; diethylene glycol; propylene glycol; glycerol; hexanetriol; butanetriol; trimethylol propane; trimethylol ethane; pentaerythritol, and the like.

A proportion of an aliphatic acid can be incorporated into the composition. Adipic acid is generally preferred for this purpose, although other suitable acids can be used such as oxalic, malonic, succinic, glutaric, pimelic, suberic, azelaic, sebacic, etc. For certain purposes unsaturated acids such as maleic, citraconic, itaconic, etc., can be used. Suitable tricarboxylic compounds useful with the halogenated bicyclic diols include trimellitic acid, trimellitic anhydride, tricarballylic acid, tricarballylic anhydride, and the like.

A large number of various organic polyisocyanates can be used. The aromatic polyisocyanates are more reactive and less toxic than the aliphatic members. Consequently, the aromatic compounds are preferred in the present invention. The preferred compounds which are at present most readily available commercially are 2,4-tolylene diisocyanate; 2,6-tolylene diisocyanate and mixtures thereof. However, others can be used, among them 4,4' - methylene-bis(phenyl isocyanate); 3,3' - bitolylene-4,4'-diisocyanate; 3,3'-dimethoxy-4,4'-biphenylene diisocyanate; 1,5-naphthyl diisocyanate, and the like. Furthermore, mixtures of polyisocyanates can be used, including the crude commercial mixtures that are available.

The polyisocyanate concentration can be varied over a wide range, for example from about thirty to about two hundred percent of isocyanato groups based on the number of hydroxyl, carboxyl and equivalent groups present in the hydroxyl containing components (and foaming agent, when one is used); the preferred range is eighty-five to one hundred and fifteen percent. By equivalent groups is meant other isocyanate-reactive groups such as acid halide and the like, as well as free water present.

When the polyurethane compositions of the invention are foamed, any foaming agent can be employed that is capable of liberating gaseous products when heated or when reacted with an isocyanate. One foaming system which is especially suitable for carrying out the foaming reaction at an elevated temperature is found in United States Patent 2,865,869, which discloses and claims the use of tertiary alcohols in the presence of strong, concentrated acid catalysts. Examples of tertiary alcohols include: tertiary amyl alcohol; tertiary butyl alcohol; 2-methyl-3-butyn-2-ol; 1-methyl-1-phenylethanol; and 1,1,2,2-tetraphenylethanol, etc. Examples of catalysts include: sulfuric acid; phosphoric acid; sulfonic acid; and aluminum chlorine; etc. In addition, various secondary alcohols and glycols may be used as: 1-phenyl-1,2-ethanediol; 2-butanol; etc. Generally secondary alcohols should be used with strong concentrated acid catalysts as above; however, certain secondary alcohols may be used without the acid catalyst, e.g., acetaldol, chloral hydrate, etc. Other foaming agents that can be used include the following: polycarboxylic acids, polycarboxylic acid anhydrides, dimethylol ureas, polymethylol phenols, formic acid and tetrahydroxy methylphosphonium chloride. In addition, mixtures of the above foaming agents may be employed.

Preferably, the polyurethane compositions of the present invention can be foamed without a reactive foaming agent. This is usually done by introducing a low boiling liquid into the catalyzed resin. The heat of reaction is then sufficient to expand the mixture to a foam stable enough to retain its shape until the resin gels. Suitable liquids are the fluorochlorocarbons boiling in the range of −30 to 50 degrees centigrade, preferably 20 to 50 degrees, and mixtures thereof, for example, trichlorofluoromethane, trichlorotrifluoroethane, dichloromonofluoromethane, monochloroethane, monochloromonofluoroethane, difluoromonochloroethane, and difluorodichloroethane.

The polyurethane compositions of the present invention can, if desired, be stored at low temperatures and foamed thereafter.

In our Patent No. 3,055,850, there are disclosed polyurethane compositions wherein all or a portion of the adduct of hexahalocyclopentadiene is reacted with a polyisocyanate to form a prepolymer and the remainder of the halogenated compound can be used in the preparation of the alkyd. Foamable compositions prepared in accordance with that invention are much easier to handle than the aforementioned solid alkyd system, because the alkyd portion of the composition remains liquid. It is within the scope of the present invention to use the low viscosity liquids of the present invention in the compositions of the above-mentioned patent to modify the viscosity of said system and improve the processibility thereof.

The following examples are set forth to further illustrate the teachings of this invention, but are not intended to limit the invention in any manner. Parts are by weight and temperatures in degrees centigrade unless specified otherwise.

Example 1

A polyester having an acid number of less than one, a hydroxyl number of 504, corresponding to 4 to 5 hydroxyl groups per molecule, and a molecular weight of 350, was prepared by reacting five moles of trimethylolpropane and three moles of adipic acid at a temperature of 210 degrees centigrade under vacuum. Two hundred grams of this polyester were blended with two hundred grams of a polyester comprising 7.6 moles of glycerine, four moles of adipic acid and two moles of 1,4,5,6,7,7-hexachlorobicyclo - (2.2.1) - 5-heptene-2,3-dicarboxylic acid cooked to an acid number of five and having a hydroxyl number of 265, and forty grams of an equimolar mixture of monobutyl and dibutyl acid phosphates at 60 degrees centigrade. The temperature was dropped to 45 degrees centigrade and a solution of 435 grams of semi-prepolymer and 70 grams of trichlorofluoromethane was added with rapid stirring. The semi-prepolymer was prepared from 25 parts of the above-mentioned chlorine-containing polyester and 75 parts of a commercial mixture of 80 percent 2,4-tolylene diisocyanate and 20 percent 2,6-tolylene diisocyanate. After one minute the mixture was poured into a mold and permitted to expand and cure at room temperature. The foam had good cell structure and was self extinguishing. The foam had good mechanical strength at room temperature and at 120 degrees centigrade, and was not distorted after being held for one week at 70° C. and 100 percent relative humidity.

Using the procedure of Example 1, other useful polyurethane foams containing alkyd resins prepared from adducts of hexahalocyclopentadiene were produced using polyester additives prepared as described in the following examples.

Example 2

A polyester was prepared by reacting 8.8 moles of trimethylol propane, 4 moles of adipic acid and 2 moles of fumaric acid at a temperature of 210 degrees centigrade. The resulting polyester had a hydroxyl number of 453, an acid number of about one, and a molecular weight of about 600.

Example 3

A polyester was prepared by reacting 7 moles of trimethylol propane, 3 moles of glycerol, and 6 moles of adipic acid at a temperature of 210 degrees centigrade. The resulting polyester had a hydroxyl number of 538, an acid number of about one, and a molecular weight of about 990.

Example 4

A polyester was prepared by reacting 10 moles of 1,2,6-hexanetriol and 6 moles of adipic acid at 200 degrees centigrade under vacuum. The resulting polyester resin had an acid number of less than 1, a hydroxyl number of 485 and a molecular weight of about 1000.

Example 5

A polyester was prepared by reacting 10 moles of 1,2,6-hexanetriol and 6 moles of diglycolic acid at a temperature of 200 degrees centigrade under vaccum. The resulting polyester resin had an acid number of one, a hydroxyl number of 524 and a molecular weight of about 960.

Example 6

A polyester was prepared by reacting 10 moles of trimethylol propane, 6 moles of diglycolic acid at a temperature of 200 degrees centigrade under vacuum to produce a polyester resin having an acid number of about 1, a hydroxyl number of 524 and a molecular weight of about 960.

Example 7

An alkyd resin was prepared by mixing 182.5 grams of 2,3-dimethylol-1,4,5,6,7,7-hexachlorobicyclo-(2.2.1)-5-heptene, 92 grams of glycerol and 162 grams of phthalic anhydride and heating the mixture to 150 degrees centigrade in the presence of toluene. At the completion of the reaction the toluene was removed by vacuum distillation.

Thereafter, thirty grams of the trimethylol propane-adipate employed in Example 1 is added to the alkyd resin, followed by 400 grams of toluene diisocyanate and the mixture is held at 60 degrees centigrade until it becomes compatible. A foaming agent comprising forty milliliters of a mixture of ten parts of tertiary amyl alcohol and one part of concentrated sulfuric acid is added to the polymer mixture, which is held for two minutes and poured into a mold. The mixture is expanded and cured at 120 degrees centigrade for two hours, producing a strong, low density foam.

Example 8

An alkyd resin is prepared by heating together 2.5 moles of trimellitic anhydride, three moles of 2,3-dimethylol - 1,4,5,6,7,7-hexachlorobicyclo-(2.2.1)-5-heptene and 4.5 moles of ethylene glycol to produce a polymer having an acid number of six and a hydroxyl number of 252. To a hot mixture of forty grams of this alkyd, 0.3 gram of Emulphor EL–719 and eight grams of the trimethylol propane-adipate employed in Example 1 are added 45.2 grams of toluene diisocyanate in two parts. The mixture is stirred until all components are compatible and then cooled to about 60 degrees centigrade. A solution of six drops of concentrated sulfuric acid and 4.4 cc. of tertiary amyl alcohol is added to the mixture which is then stirred until it is white and creamy. The resulting mixture is poured at 80 degrees centigrade into a mold, and thereafter expanded and cured for one hour at 120 degrees centigrade. The product is a low density foam having a fine cell structure.

While our invention has been described with reference to certain specific embodiments, it will be recognized by those skilled in the art that many variations are possible without departing from the spirit and scope of the invention.

We claim:
1. A polyurethane composition produced by reacting components comprising (I) a mixture comprised of (A) an alkyd resin selected from the group consisting of (1) the reaction product of (a) an adduct of hexahalocyclopentadiene and a polycarboxylic compound containing aliphatic carbon-to-carbon unsaturation, and (b) a polyhydric alcohol containing at least three hydroxyl groups, (2) the reaction product of (a) an adduct of hexahalocyclopentadiene and a polyhydric alcohol containing aliphatic carbon-to-carbon unsaturation, (b) a polyhydric alcohol containing at least three hydroxyl groups and (c) a polycarboxylic compound, (3) the reaction product of (a) an adduct of hexahalocyclopentadiene and a polyhydric alcohol containing aliphatic carbon-to-carbon unsaturation, and (b) a polycarboxylic compound containing at least three carboxyl groups, and (4) mixtures thereof, wherein the halogen is selected from the group consisting of chlorine, fluorine, bromine and mixtures thereof, and (B) a low molecular weight polyester having at least three hydroxyl groups per molecule and a hydroxyl number in the range of 200 to 950; and (II) an organic polyisocyanate.

2. The composition of claim 1 wherein the adduct of hexahalocyclopentadiene and a polycarboxylic compound is 1,4,5,6,7,7-hexachlorobicyclo-(2.2.1)-5-heptene-2,3-dicarboxylic acid.

3. The composition of claim 2 wherein the polyester is the reaction product of trimethylol propane and adipic acid.

4. A polyurethane composition produced by reacting components comprising (I) a mixture comprised of (A) an alkyd resin comprised of the reaction product of (a) an adduct of hexahalocyclopentadiene and a polycarboxylic compound containing aliphatic carbon-to-carbon unsaturation, wherein the halogen is selected from the group consisting of chlorine, fluorine, bromine and mixtures thereof, and (b) a polyhydric alcohol containing at least three hydroxyl groups; and (B) a low molecular weight polyester having at least three hydroxyl groups per molecule and a hydroxyl number in the range of 200 to 950; and (II) an organic polyisocyanate.

5. The polyurethane composition of claim 4 wherein the polyester is the reaction product of trimethylol propane and adipic acid.

6. A fire-resistant, cellular reaction product produced by reacting (I) a composition comprising a mixture of (A) an alkyd resin selected from the group consisting of (1) the reaction product of (a) an adduct of hexahalocyclopentadiene and a polycarboxylic compound containing aliphatic carbon-to-carbon unsaturation, and (b) a polyhydric alcohol containing at least three hydroxyl groups, (2) the reaction product of (a) an adduct of hexahalocyclopentadiene and a polyhydric alcohol containing aliphatic carbon-to-carbon unsaturation, (b) a polyhydric alcohol containing at least three hydroxyl groups and (c) a polycarboxylic compound, (3) the reaction product of (a) an adduct of hexahalocyclopentadiene and a polyhydric alcohol containing aliphatic carbon-to-carbon unsaturation, and (b) a polycarboxylic compound containing at least three carboxyl groups, and (4) mixtures thereof, wherein the halogen is selected from the group consisting of chlorine, fluorine, bromine and mixtures thereof, and (B) a low molecular weight polyester having at least three hydroxyl groups per molecule and a hydroxyl number in the range of 200 to 950; with (II) an organic polyisocyanate, in the presence of (III) a foaming agent.

7. The cellular reaction product of claim 6 wherein the adduct of hexahalocyclopentadiene and a polycarboxylic compound is 1,4,5,6,7,7 - hexachlorobicyclo-(2.2.1)-5-heptene-2,3-dicarboxylic acid.

8. The cellular reaction product of claim 6 wherein the polyester is the reaction product of trimethylol propane and adipic acid.

9. The cellular reaction product of claim 6 wherein the foaming agent is a fluorochlorcarbon boiling in the range of −30 to 50 degrees centigrade.

10. The cellular reaction product of claim 9 wherein the fluorochlorocarbon is trichlorofluoromethane.

11. A fire-resistant cellular reaction product produced by reacting a composition comprising (I) a mixture comprised of (A) an alkyd resin comprised of the reaction product of (a) an adduct of hexahalocyclopentadiene and a polycarboxylic compound containing aliphatic carbon-to-carbon unsaturation, wherein the halogen is selected from the group consisting of chlorine, fluorine, bromine and mixtures thereof, and (b) a polyhydric alcohol containing at least three hydroxyl groups, and (B) a low molecular weight polyester having at least three hydroxyl groups per molecule and a hydroxyl number in the range of 200 to 950; (II) an organic polyisocyanate; and (III) a foaming agent.

12. The cellular reaction product of claim 11 wherein the polyester is the reaction product of trimethylol propane and adipic acid.

13. The method for producing a polyurethane foam which comprises reacting (I) a mixture comprised of (A) an alkyd resin containing an adduct of hexahalocyclopentadiene wherein the halogen is selected from a group consisting of fluorine, chlorine, bromine and mixtures thereof, and (B) a low molecular weight polyester having at least three hydroxyl groups per molecule, a hydroxyl number in the range of 200 to 950, a viscosity of less than 100 Gardner seconds at 50 degrees centigrade, and which is capable of reacting with an isocyanate, with (II) an organic polyisocyanate, in the presence of (III) a foaming agent.

14. The method of claim 13 wherein the alkyd resin is selected from the group consisting of (1) the reaction product of (a) an adduct of hexahalocyclopentadiene and a polycarboxylic compound containing aliphatic carbon-to-carbon unsaturation, and (b) a polyhydric alcohol containing at least three hydroxyl groups, (2) the reaction product of (a) an adduct of hexahalocyclopentadiene and a polyhydric alcohol containing aliphatic carbon-to-carbon unsaturation, (b) a polyhydric alcohol containing at least three hydroxyl groups and (c) a polycarboxylic compound, (3) the reaction product of (a) an adduct of hexahalocyclopentadiene and a polyhydric alcohol containing aliphatic carbon-to-carbon unsaturations, and (b) a polycarboxylic compound containing at least three carboxyl groups, and (4) mixtures thereof.

15. The method of claim 14 wherein the polyester is the reaction product of trimethylol propane and adipic acid.

16. The method of claim 13 wherein the foaming agent is a fluorochlorocarbon boiling in the range of −30 to 50 degrees centigrade.

17. The method of claim 16 wherein the fluorochlorocarbon is trichlorofluoromethane.

References Cited by the Examiner

UNITED STATES PATENTS

| | | | |
|---|---|---|---|
| 2,811,493 | 10/57 | Simon et al. | 260—2.5 |
| 2,959,242 | 11/60 | Muller et al. | 260—2.5 |
| 2,962,183 | 11/60 | Rill et al. | 260—2.5 |
| 3,054,760 | 9/62 | Worsley et al. | 260—2.5 |
| 3,106,537 | 10/63 | Simon et al. | 260—2.5 |

FOREIGN PATENTS 562,499  12/57  Belgium.

OTHER REFERENCES

Farringer, "Rigid Urethane Foams—II, Chemistry and Formulation," Du Pont Elastomer Chem. Dept. Bulletin HR–26; Apr. 1958, 56 pp., P. 29, 30, and 39 relied upon.

LEON J. BERCOVITZ, *Primary Examiner.*